United States Patent
Elvanoglu et al.

(10) Patent No.: US 7,739,691 B2
(45) Date of Patent: Jun. 15, 2010

(54) FRAMEWORK FOR DECLARATIVE EXPRESSION OF DATA PROCESSING

(75) Inventors: Ferhan Elvanoglu, Redmond, WA (US); Violeta Patrutoiu, Bellevue, WA (US); Nirav A. Kamdar, Redmond, WA (US); Jin Feng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1355 days.

(21) Appl. No.: 11/118,155

(22) Filed: Apr. 29, 2005

(65) Prior Publication Data

US 2006/0248467 A1 Nov. 2, 2006

(51) Int. Cl.
G06F 3/00 (2006.01)
G06F 9/44 (2006.01)
G06F 9/46 (2006.01)
G06F 13/00 (2006.01)

(52) U.S. Cl. .................. 719/319; 719/313; 719/320; 717/1; 717/10

(58) Field of Classification Search .............. 707/104.1, 707/200, 1, 10; 719/320, 313, 319
See application file for complete search history.

(56) References Cited

U.S. PATENT DOCUMENTS

| | | | | |
|---|---|---|---|---|
| 5,937,409 A | * | 8/1999 | Wetherbee | 707/103 R |
| 6,134,559 A | * | 10/2000 | Brumme et al. | 707/103 R |
| 7,197,515 B2 | * | 3/2007 | Rivers-Moore et al. | 707/200 |
| 7,313,575 B2 | * | 12/2007 | Carr et al. | 707/104.1 |
| 2002/0120685 A1 | * | 8/2002 | Srivastava et al. | 709/203 |
| 2004/0243554 A1 | * | 12/2004 | Broder et al. | 707/3 |
| 2004/0249823 A1 | * | 12/2004 | Raghuvir et al. | 707/100 |
| 2005/0171970 A1 | * | 8/2005 | Ozzie et al. | 707/102 |

* cited by examiner

Primary Examiner—Diem K Cao
(74) Attorney, Agent, or Firm—Perkins Coie LLP (57) ABSTRACT

A framework for declarative expression of data processing is provided. The framework allows for data to be represented by its metadata in a declarative manner, allowing for the generation of code at, for example, build time. The declarative representation of the metadata facilitates the separation of the data (e.g., the raw data that is stored in a data store and that is available using, for example, a data store adapter) from the code (e.g., the code that is executed for the manipulation and validation of data) and the view (e.g., the form that the data is shown to a user, for example, through a UI).

14 Claims, 10 Drawing Sheets

```xml
<class name="LogServiceSetting"
    isSingleton="true"
    customClassValidator="LogServiceSettingValidator">
    <metadata>
        <supportedStores>
            <store name="WMI"/>
            <!-- store adapter specific data goes in here...-->
        </store>
        </supportedStores>
        <properties>
            <property name="InstanceID"
                key="true" type="guid" readOnly="true" />
            <property name="QueueName"
                type="string" length="115" caseSensitive="false"
                isNullAllowed="false" readOnly="true"
                customPropertyValidator="QueueNameCustomPropertyValidator"/>
            <property name="ConcurrentThreads"
                type="uint32" minValue="1" maxValue="64" isNullAllowed="false" />
            <property name="SQLDBName"
                type="string" length="128"
                caseSensitive="false" isNullAllowed="false" readOnly="true" />
            <property name="ArchivingDBPath"
                type="string"
                length="-1" caseSensitive="false" isNullAllowed="false" />
            <property name="DaysOfArchiving"
                type="uint32" minValue="0" maxValue="2562" isNullAllowed="false" />
        </properties>
    </metadata>
</class>
```

```
<?xml version="1.0" encoding="utf-8" ?>
<IcSnapConfig>

<!-- "Pool" node -->
    <node type="{DFCECBA3-A758-4A88-AFF5-D5FA4DEF8DCC}">
        <tab displayName="Status"
            builtin="TRUE"
            src="SIPSNAP_POOL_STATUS.HTM"
            tooltip="This page shows the current status of the pool." />
        <tab displayName="Resources"
            builtin="TRUE"
            src="SIPSNAP_RESOURCES.HTM"
            tooltip="This page contains the related resources."
            width="110" />
    </node>

</IcSnapConfig>
```

802 — <!-- "Pool" node -->
804 — <node type=...>
806 — <tab displayName=...
808 — builtin="TRUE"
810 — src=...
812 — tooltip=...
814 — width="110" />

FIG. 8

```xml
<?xml version="1.0" encoding="utf-8" ?>
<IcSnapConfig>

<!-- "Pool" node -->
    <node type="{DFCECBA3-A758-4A88-AFF5-D5FA4DEF8DCC}">
        <tab displayName="Status"
            builtin="TRUE"
            src="SIPSNAP_POOL_STATUS.HTM"
            tooltip="This page shows the current status of the pool." />
        <tab displayName="Resources"
            builtin="TRUE"
            src="SIPSNAP_RESOURCES.HTM"
            tooltip="This page contains the related resources."
            width="110" />
        <tab displayName="Event Logs "
            builtin="FALSE"
            src="SIPSNAP_POOL_EVENT_LOGS.HTM "
            tooltip="This page contains the event logs of the pool."
            width="150" />
    </node>

</IcSnapConfig>
```

902 { (brace encompassing the "Event Logs" tab block)

*FIG. 9*

```
<?xml version="1.0" encoding="utf-8" ?>
<state>
    <context>
        <forest>jindom3.nttest.microsoft.com</forest>
        <domain>jindom3.nttest.microsoft.com</domain>
        <pool>eepool01.jindom3.nttest.microsoft.com</pool>
    </context>
    <stateDetail>
        <backend>jinfeng-vpca</backend>
        <totalServers>1</totalServers>
        <numDevices>0</numDevices>
        <federationOverwrite>TRUE</federationOverwrite>
        <networkAddress>NULL</networkAddress>
        <port>5061</port>
        <authScheme>Both</authScheme>
    </stateDetail>
</state>
```

1002 — `<context>`
1004 — `<stateDetail>`

*FIG. 10*

FRAMEWORK FOR DECLARATIVE EXPRESSION OF DATA PROCESSING

TECHNICAL FIELD

The described technology is directed generally to application programming and, more particularly, to techniques for decoupling functionality from an application program using declarative expressions.

BACKGROUND

Persisting state and data into a database is an important part of many solutions and applications. In the databases, the data can be saved in many formats, such as text, application-specific binary, or a format that is supported by generally available database engines such as MICROSOFT SQL Server. Often times, as an application is developed, the application ends up containing details about the specific storage format or method. In addition, the format of the data when stored is usually different than the format of the data in memory, for example, as it is used by the application. For example, an application may be required to convert a number to a string in order to save to a text file, or construct an XML text block in order to save it into an XML file. Moreover, in order to store the data in a database, the data may need to be converted to a type that is supported by the database engine used.

When converting data formats, the application typically needs to validate the data for the new form the data is taking. For example, an application that needs to convert a "number" to a "string" in order to save an integer into a text file may be required to perform a length check on the number if the file has limited space allocated for the data being written. The application also needs to check the integrity of the data before actually storing the data in its new form. In these applications, the validation and integrity-checking code is typically tightly integrated with the application code—i.e., the data conversion and rules for validating the converted data types and checking the integrity of the converted data before storing the data ends up becoming an integral part of the application.

The integration of the validation and integrity-checking code with the application code presents many problems. A major problem is the time and energy required to add or change a storage type in an application where the validation and integrity-checking code is tightly integrated with the application code. For example, in order to add or introduce a new storage target in an application that is using an existing storage type, all of the validation and integrity-checking needs to be repeated in the application for the new storage target. Also, where an application is using multiple types of storage, changes to any of the storage types requires all of the validation and integrity-checking to be repeated in the application for each of the storage types that is being changed.

The tight integration of code is also present in the development of user interfaces (UIs). Many server, and sometimes client, software products provide an administrative UI that allows users, such as administrators or end users, to locally or remotely configure the settings for the various aspects of the products, and allows users to monitor the health statistics of the running software process. In the server management UI, there are typically a set of nodes representing different deployment or management entities.

By way of example, a server's administrative console may include a set of deployment/management entities such as, an Active Directory forest, domains inside the forest, server pools, servers associated with the pools, users that are assigned to different pools, etc. Each type of node may represent a logical deployment/management entity that is associated with, for example, different sets of properties, management tasks and extensibility points. In conventional implementations, the management software typically "hard codes" a set of UI elements for each entity, and each entity has the built-in knowledge of what set of UI elements it needs to display as well as how to organize and render these elements. In these implementations of the management software, the coupling is very tight between the deployment/management entities and their corresponding UI elements. A major drawback to the tight coupling between the deployment/management entities and their corresponding UI elements is that a change to the logic in the UI elements or to the deployment/management entities usually causes a rebuild of several binaries in the product.

Another drawback is the inflexibility caused by the tight coupling between the deployment/management entities and their corresponding UI elements. For example, if a set of new UI elements needs to be added for a particular deployment/management entity, the entity code needs to be changed, rebuilt, tested and redistributed to, for example, a customer with the knowledge of these newly added UI elements. The customer needs to know how to create, organize, render and communicate with these UI elements. Moreover, the code for these new UI elements needs to be written, built, tested and redistributed to the customer as well. The cost associated with these steps can be very high, and may force the development of incremental, yet important additions/changes, which could otherwise reach the targeted customers more quickly and drive up customer satisfaction, to be "pushed off" or delayed, for example, to a next release of the product.

It would be desirable to have a technique that allows for the decoupling of various functionalities from the application code.

DETAILED DESCRIPTION

A framework for declarative expression of data processing is provided. The framework allows for data to be represented by its metadata in a declarative manner, allowing for the generation of code, for example, at build time. In some embodiments, metadata for all data types and classes may be represented in a declarative fashion, such as in XML format. The declarative representation of the metadata facilitates the separation of the data—e.g., the raw data that is stored in a data store and that is available using, for example, a data store adapter—from the code—e.g., the code that is executed for the manipulation and validation of data—and the view—e.g., the form that the data is shown to a user, for example, through a UI. In some embodiments, a data store is a medium that stores properties—e.g. SQL, XML, Active Directory, WINDOWS Management Instrumentation (WMI), etc.

In some embodiments, the framework allows configuration data for an application to be represented using declarative expressions, allowing for the generation of configuration data storage binding during build time. For example, an application, such as MICROSOFT'S LIVE COMMUNICATIONS SERVER, may store configuration data in multiple data stores, such as ACTIVE DIRECTORY, plain XML files, local WMI store, and SQL database. In order to interact with and access the data stored in each of the data stores (e.g., databases), the application needs to know information about the data stored in each of the data stores, as well as the characteristics of each of the data stores. For example, the application may require knowledge of what data classes it is storing in each of the data stores, as well as the validation code for each data type. An application developer can provide a framework that ties the data types, validation routines, and the data stores in a declarative manner separate from the application code, thus decoupling the information regarding the data types and the validation routines from the application logic. Since the information regarding the data types, validation routines, and the data stores is declarative, the framework allows primitives to be tied and bound together at build time and runtime, based on the declarative expressions instead of requiring manual labor from a developer.

The framework allows the application developer to: (1) represent all the data using a basic set of data types (e.g., integer, byte, string, Boolean, integer array, byte array, string array, and Boolean array); (2) declaratively express the finite number of validation checks (e.g., range check for an integer, length check for a string, a string's value check against a list of possible values, etc.) required by most data types; (3) in cases where a data type requires custom validation, specify a function name from, for example, a validation library, to validate the data type or block; and (4) for each data class and field, add data store specific details into the declarative content, thus allowing store adapters for each of the data stores to place the data in the right place/location within their respective data stores.

In some embodiments, the framework provides an application-independent mechanism for decoupling task display code from the task client code. For example, the framework allows application developers to decouple the entities (e.g., deployment/management entities, such as forests, domains inside each forest, pools, servers associated with the pools, users assigned to the pools, etc.) from their corresponding UI elements in developing the software for a UI to view and/or access the entities and their corresponding UI elements.

In some embodiments, the framework uses an XML manifest to render a UI. A user, such as an application developer, declaratively defines in the XML manifest what and how the framework is to display and render the UI elements for each entity. The framework reads the XML manifest at runtime to generate the UI, thus allowing users, such as the application developer or third parties, to modify and change the XML manifest to add or remove one or multiple UI elements for one or multiple entities without downtime. The framework may provide an instantiation mechanism and UI real estate for each set of UI elements. The framework may also provide an asynchronous data-agnostic communication channel between the UI elements and the entities.

The various embodiments of the framework for decoupling functionality from application code, and its advantages are best understood by referring to FIGS. 1-10 of the drawings. The elements of the drawings are not necessarily to scale, emphasis instead being placed upon clearly illustrating the principles of the invention. Throughout the drawings, like numerals are used for like and corresponding parts of the various drawings.

Figure 1:
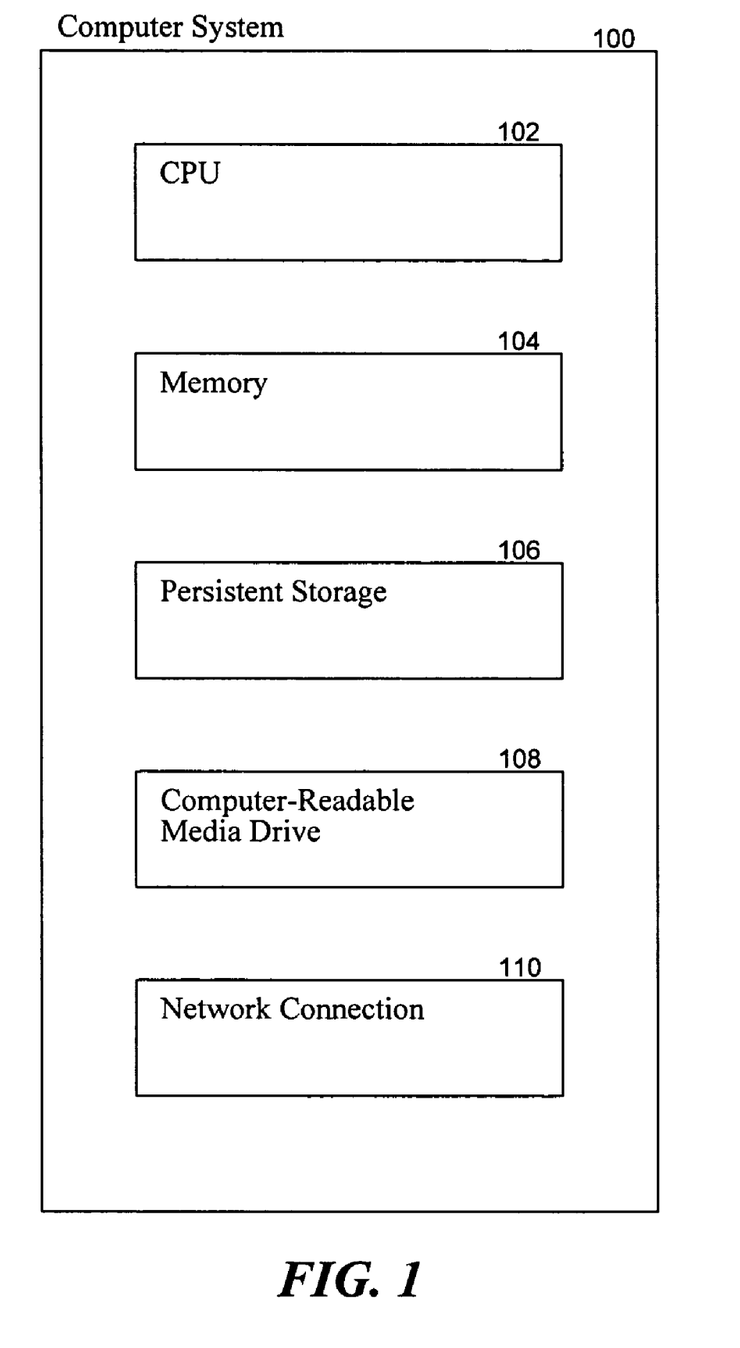
FIG. 1 is a block diagram illustrating selected components typically incorporated in at least some of the computer systems on which various embodiments of the framework and its components may be implemented.

FIG. 1 is a block diagram illustrating selected components typically incorporated in at least some of the computer systems on which various embodiments of the framework and its components may be implemented. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures. It will be appreciated that computer systems 100 may include one or more display devices for displaying program output, such as video monitors or LCD panels, and one or more input devices for receiving user input, such as keyboards, microphones, or pointing devices such as a mouse.

Embodiments of the framework and its components may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The framework may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the screen resolution gathering and reporting system.

In the discussion that follows, various embodiments of the framework are further described in conjunction with a variety of illustrative examples. It will be appreciated that the embodiments of the framework may be used in circumstances that diverge significantly from these examples in various respects.

For example, even though various embodiments of the framework are described in conjunction with tying of data type, validation routines and data stores, the framework need not be limited only to data and data storage binding. As such, one skilled in the art will appreciate that the framework can be adapted to generally separating data-storage, data validation and data-access logic.

Figure 2:
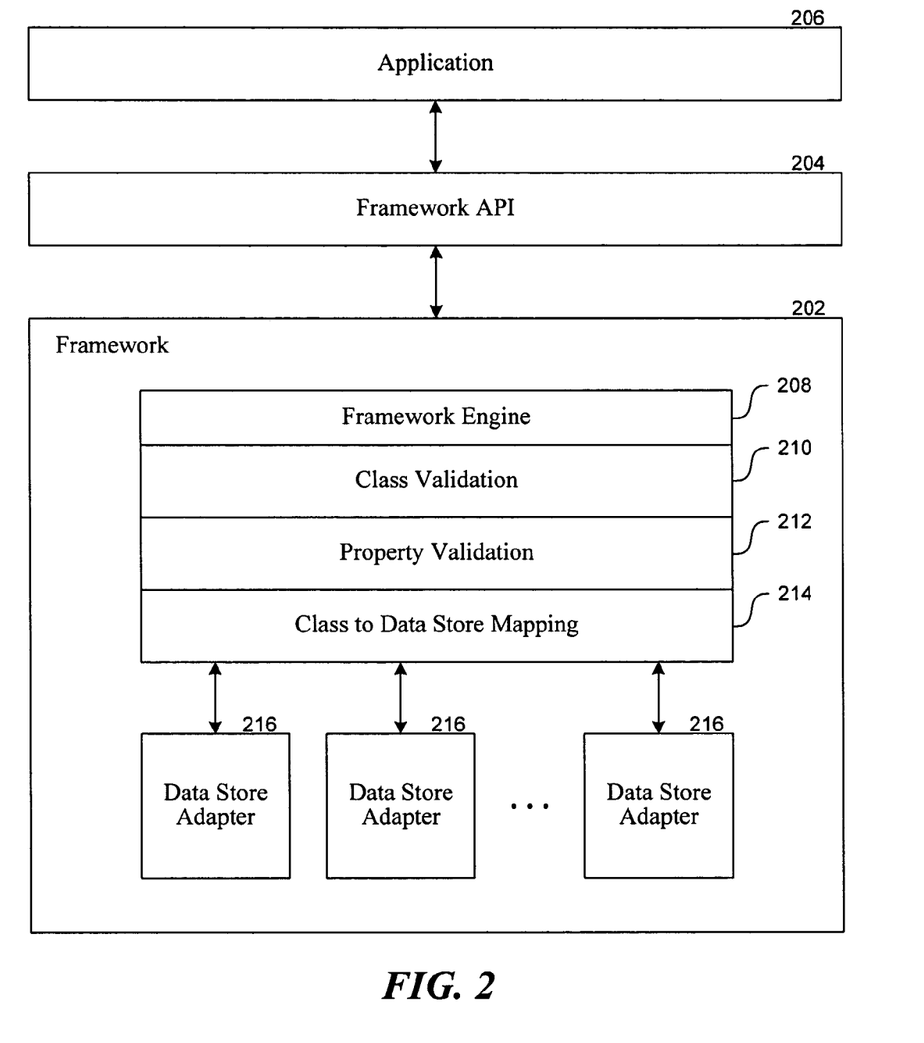
FIG. 2 is a high-level block diagram showing an environment in which the framework may operate.

FIG. 2 is a high-level block diagram showing an environment in which the framework may operate. The environment is only one example of a suitable operating environment and is not intended to suggest any limitation as to the scope of use or functionality of the framework. As depicted, the environment comprises framework 202, a framework API 204, and an application 206. Although not depicted in FIG. 2, one skilled in the art will appreciate that some or all of the components of the environment may communicate with each other via a network, such as the Internet or other suitable networks.

In general terms, the framework facilitates the validation, correlation, and storage of data into appropriate data stores without having to build this knowledge into the application at application development time. The framework is a metadata-driven infrastructure, and includes the declarative representation of the metadata for all the supported data types and classes, declarative expression of validation checks for the classes and/or properties, any necessary custom validation routines for the classes and/or properties, data store specific details, supported data store adapters, and other general logic necessary for the handling of the supported data types and classes.

As depicted in FIG. 2, the framework comprises a framework engine 208, class validation 210, property validation 212, class to data store mapping 214, and a plurality of data store adapters 216. The framework engine contains the logic to process the calls to access the supported data. For example, the framework engine can receive a call to access data via the framework API. To process the call, the framework engine uses the metadata to perform the necessary validation, determine the data store that is associated with the data, identify the data store adapter for the data store, enable the data store adapter to communicate with its data store, and return the results of the call to access or modify the data.

The class validation is the class level validation of the supported data, and may provide a "stock" class handler for all supported classes. In some embodiments, the class validation may include declarations of custom class handlers for specific classes. Class handlers are aware of all properties the class supports, and a class handler can validate all properties of a class. Class handlers are further discussed below.

The property validation is the property level validation of the supported data, and comprises a "stock" handler for all supported properties. In some embodiments, the property validation may include declarations of custom property handlers for specific properties. In contrast to a class handler which has larger visibility and functionality, a property handler is responsible for only its associated property, and the property handler can base its decisions only on the data that a property is carrying or will carry if the operation succeeds. Property handlers are further discussed below.

The class to data store mapping is a mapping between the supported classes and their respective data stores. The mapping between the supported classes and their respective stores enables the code—i.e., the framework—to decide which data store adapter to communicate with for a particular class. In some embodiments, the mapping is a many-to-many relationship between classes and data stores. For example, a class may be stored in many data stores and many classes may be stored in one data store. In general terms, the data store adapters are abstraction layers for the data stores supported by the facility, and function as interfaces to their respective data stores. The data store adapters enable the facility to communicate with their respective data stores via defined interfaces to, for example, store (i.e., write) data to, or retrieve (i.e., read) data from the respective data stores.

The framework API is an interface to the framework, and is an abstraction layer between the application and the framework. The framework API exposes a plurality of calls that provide access to the classes and properties that are supported by the framework. For example, when the application utilizes the framework API and makes or initiates a call to write a class or property, the framework API passes the call to the framework—e.g., the code registered to handle the call—allowing the framework to determine from the metadata the validation that needs to be performed, call the necessary functions to perform the validation, and pass the data to the proper data store adapter to write to the data store. If the call made by the application is a read call, the same set of steps outlined above may be followed, except for the validation. Thus, the framework API allows the applications to be agnostic of data storage and data access mechanisms.

A programmer declaratively represents the metadata for the supported data types and classes in the framework using, for example, a markup language such as XML. In some embodiments, the programmer first divides the supported data into classes. A class may be considered the equivalent of a table in a database, such as SQL, in that the class represents a group of data fields that form a coherent group. A class may also be considered a unit for a set of data fields and properties. For example, assuming a class represents a server, then the server's name, IP address, administrator's name, etc., can each be the class' data fields or properties. For each class, metadata represents these member properties, the supported data stores for the class, the validation rules for both the class and the member properties, and the way to access and modify this property in the data store that stores the property.

Figure 3:
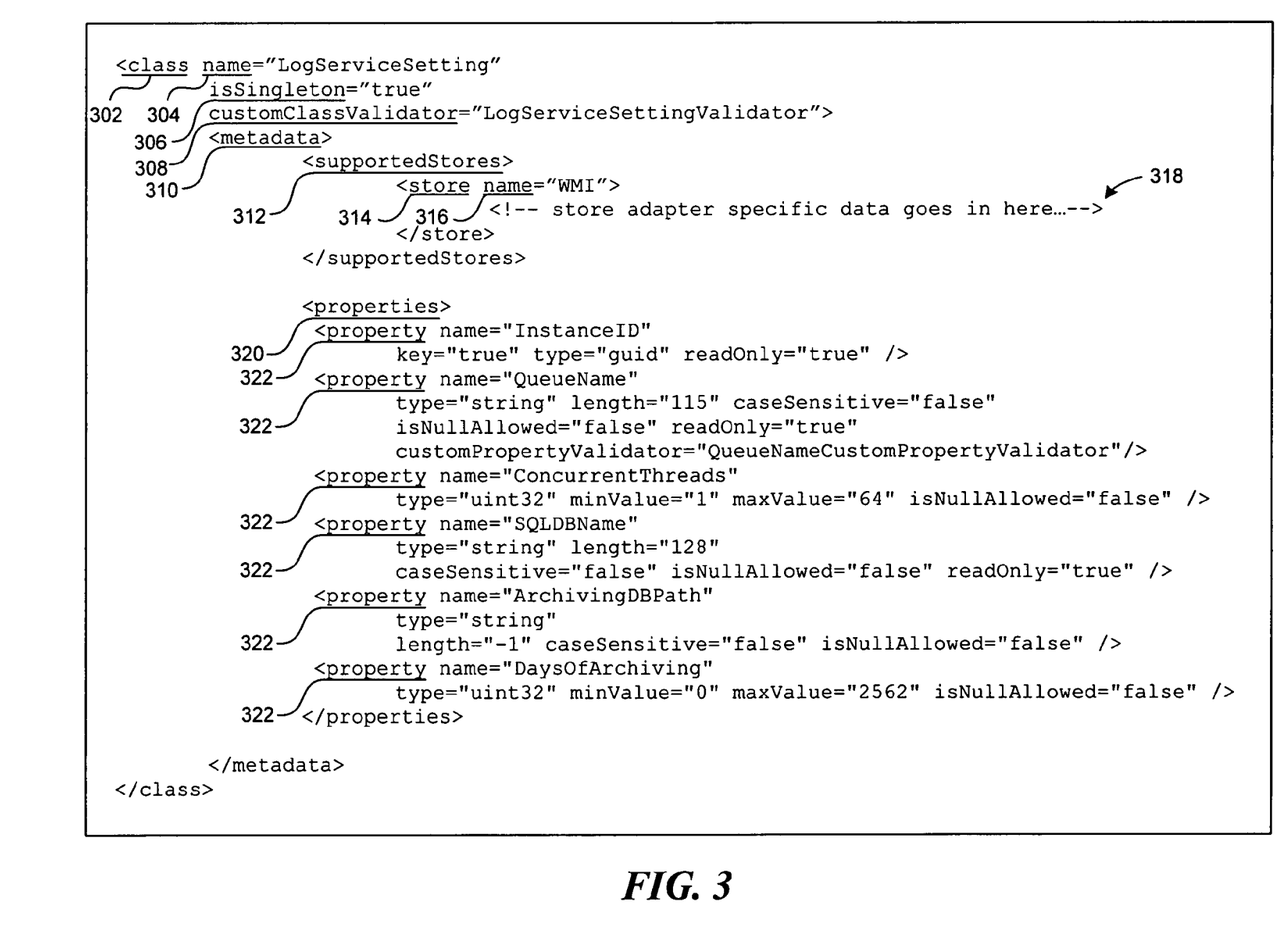
FIG. 3 illustrates an example metadata hierarchy, according to some embodiments.

FIG. 3 illustrates an example metadata hierarchy, according to some embodiments. The example metadata hierarchy depicts a single supported class for ease of explanation only, and is not intended to suggest any limitation as to the number of classes that may be specified in the hierarchy. As depicted, tag 302 is a "class" tag and contains data about a particular supported class. Attribute 304 is a string attribute of the particular class, and contains the name of the class, for example, "LogServiceSetting." Attribute 306 is a Boolean attribute of the particular class, and is set to "true" when the class is a singleton class with a single instance that is created, for example, during setup. This attribute may be absent, in which case the attribute is considered to have the value "false." As depicted, the Boolean attribute "isSingleton" is set to "true" indicating that there can only be one instance of the class "LogServiceSetting." Attribute 308 is an optional string attribute of the particular class and, if present, contains the name of a function that is to be used to validate the class, for example, "LogServiceSettingValidator." The specified function is a custom class handler that validates the complete class instance before it is transferred to a data store adapter to be written to a data store. For example, a class validator may be used to ensure that members of a class are coherent and meaningful relative to each other.

Tag 310 is a "metadata" tag and contains metadata information about the particular class. The metadata tag serves as a container for the supported stores tag that contains the information about the data stores that are supported for the particular class, and the property tags that represent the data about the particular class.

Tag 312 is a "supportedStores" tag and contains a list of the data stores supported for the particular class. A class can be supported by a single data store or multiple data stores, and the data stores supported for the particular class are listed in the list. Tag 314 is a "store" tag and contains data about a data store supported for the particular class. Attribute 316 is a string attribute of the particular data store, and contains the name of the supported data store, for example, "WMI." Attribute 318 contains data that is specific to a data store adapter that corresponds to the particular data store. For example, the attribute may contain information needed for the data store adapter to connect to the data store for the particular class, the information necessary to interact with the data store for the particular class (e.g., in the case of SQL, a table that the class maps to, the command to issue to the data store, etc.), and other information that may be needed to enable the data store adapter to interact with the data store to access the particular class. Additional data stores, such as, by way of example, ACTIVE DIRECTORY, SQL, XML, etc., that are supported for the particular class are listed in a similar manner by naming the data store and specifying the data that is specific to a data store adapter that corresponds to the named data store. A class may be stored in different data stores (i.e. it may have more than one supported store).

Tag 320 is a "properties" tag and contains a list of the property tags that represent the data about the particular class. Tag 322 is a "property" tag and contains information about a property of the particular class. For example, the information may be used to validate the property, check the property for consistency, and the like. Table 1 contains an example list of attributes and their definitions, which may be used to specify the information about a property:

TABLE 1

| Attribute Name | Attribute Description |
| --- | --- |
| name | A string attribute that contains the name of the property. |
| type | A string attribute that specifies the data type of the property (e.g., int, byte, string, etc.). |
| key | A Boolean attribute that indicates whether or not the property is an indexed key for searches of this class. |
| minValue | If the type is a numeric type, this attribute specifies its minimum value. |
| maxValue | If the type is a numeric type, this attribute specifies its maximum value. |
| length | If the type is a string type, this attribute specifies the length of the string in characters, not including the NULL terminator. |
| readOnly | A Boolean attribute that indicates whether or not the property is read-only. |
| isNullAllowed | A Boolean attribute that indicates whether or not a NULL value is allowed for the property. |
| caseSensitive | If the type is a string type, this attribute specifies whether or not the characters in the string are case sensitive. |
| customPropertyValidator | If the property has a custom property handler, this attribute contains the name of the function that is to be used to validate the property. |

By way of example, as depicted in FIG. 3, the second property of the class "LogServiceSetting" is "QueueName," which is of a type "string," of length "115," which is not case sensitive, which does not allow the NULL value, and which is read-only. Moreover, the property "QueueName" is to be validated by a custom property handler having the function name "QueueNameCustomPropertyValidator." Although not depicted in FIG. 3, each property tag may also contain attributes that contain data that is specific to a data store adapter that corresponds to the particular data store—i.e., data store specific information for the particular property.

In some embodiments, the framework provides a stock handler for all supported properties and classes. In addition to those handlers, a programmer can specify, for example, in metadata, additional custom handlers for further validation. For example, if the length of a string property is defined, the custom handler does not need to check for the length since the stock handler can check for the length—e.g., the allowed length of the string may have been declared in the metadata associated with the property. In this instance, if a custom property handler was specified, the custom property handler may check for other characteristics required in the property, such as, characteristics that are not possible to declare in the metadata. Similar logic is valid for class validation handlers.

Figure 4:
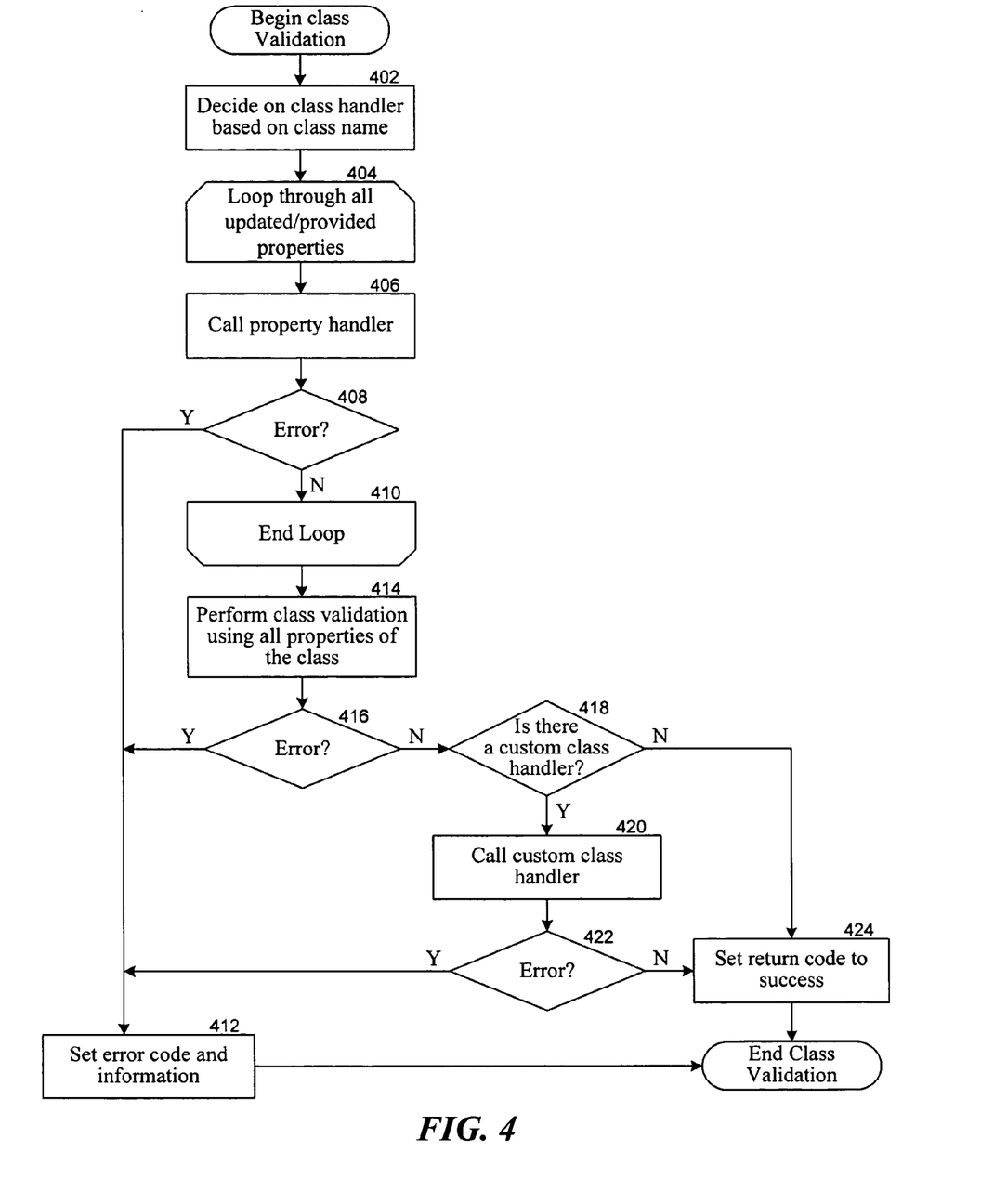
FIG. 4 is a flow diagram illustrating the processing of the framework engine when validating a class, according to some embodiments.

FIG. 4 is a flow diagram illustrating the processing of the framework engine when validating a class, according to some embodiments. A class validation handler calls handlers for all properties in the class and then calls the custom class handler if there is any declared. By way of example, the framework engine may have received a call to access a class, for example, "LogServiceSetting," from the framework API. In block 402, the framework engine determines from the metadata the class handler based on the class name, for example, "LogServiceSetting." In blocks 404 to 410, the framework engine loops through all the updated/provided properties to validate each of the updated/provided properties. In block 406, the framework engine determines from the metadata the property handler based on the property name of the property that is currently being validated, for example, "QueueName," and calls the property handler. In block 408, the framework engine checks to determine if an error condition is received from the property handler. If an error condition was returned by the property handler, then in block 412, the framework engine sets an appropriate error code and other information regarding the failed validation, and proceeds to end the class validation. Otherwise, if an error condition was not returned by the property handler, then in block 410, the framework engine processes the next property of the class that needs to be validated.

Once all of the updated/provided properties of the class have been successfully validate (blocks 404 to 410), in block 414, the framework engine performs class validation using all properties of the class. In block 416, the framework engine checks to determine whether an error occurred during the class validation. If an error occurred in performing the class validation, then in block 412, the framework engine sets an appropriate error code and information, and proceeds to end the class validation. Otherwise, if an error did not occur during the class validation, then in block 418, the framework engine determines from the metadata whether a custom class handler was specified for the class. If a custom class handler was not specified, then in block 424, the framework engine sets the return code to "success," and proceeds to end the class validation. Otherwise, if a custom class handler was specified, then in block 420, the framework engine calls the custom class handler to further validate the class. In block 422, the framework engine checks to determine whether an error occurred during the custom class validation. If an error occurred in performing the custom class validation, then in block 412, the framework engine sets an appropriate error code and information, and proceeds to end the class validation. Otherwise, if an error did not occur during the custom class validation, then in block 424, the framework engine sets the return code to "success," and proceeds to end the class validation.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 5:
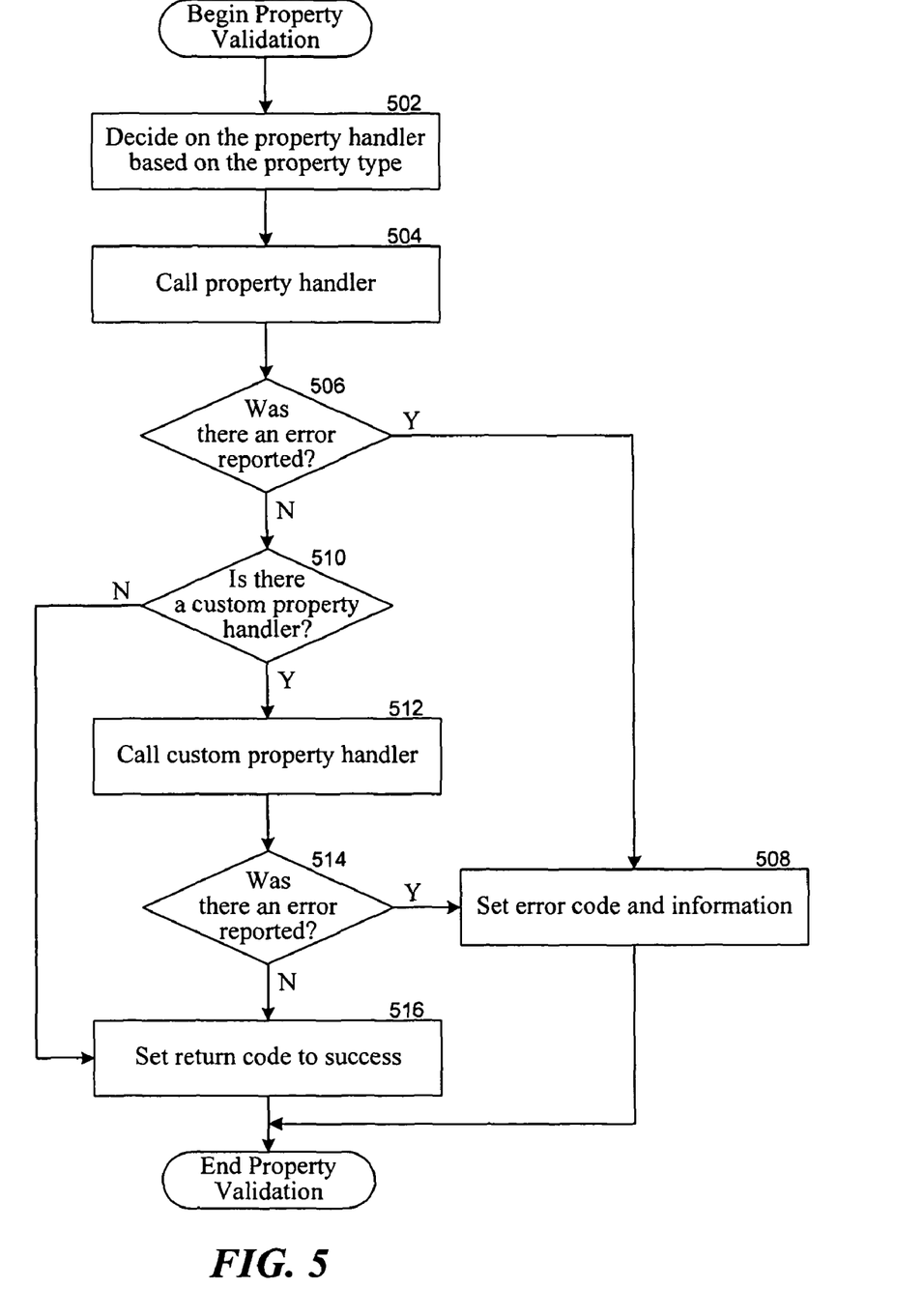
FIG. 5 is a flow diagram illustrating the processing of the framework engine when validating a property, according to some embodiments.

FIG. 5 is a flow diagram illustrating the processing of the framework engine when validating a property, according to some embodiments. By way of example, the framework engine may determine a need to validate the property "QueueName" belonging to the class "LogServiceSetting." In block 502, the framework engine determines from the metadata the property handler based on the property type. The framework engine can decide how to validate the property based on the property type. For example, based on the property type, the framework engine can call the stock property validator. In block 504, the framework engine calls the stock property handler. In block 506, the framework engine checks to determine if an error condition is received from the property handler. If an error condition was returned by the property handler, then in block 508, the framework engine sets an appropriate error code and other information regarding the failed validation, and proceeds to end the property validation. Otherwise, if an error condition was not returned by the property handler, then in block 510, the framework engine determines from the metadata whether a custom property handler was specified for the property. If a custom property handler was not specified, then in block 516, the framework engine sets the return code to "success," and proceeds to end the property validation. Otherwise, if a custom property handler was specified, then in block 512, the framework engine calls the custom property handler to further validate the property. In block 514, the framework engine checks to determine whether an error occurred during the custom property validation. If an error occurred in performing the custom property validation, then in block 508, the framework engine sets an appropriate error code and information, and proceeds to end the property validation. Otherwise, if an error did not occur during the custom property validation, then in block 516, the framework engine sets the return code to "success," and proceeds to end the property validation.

Figure 6:
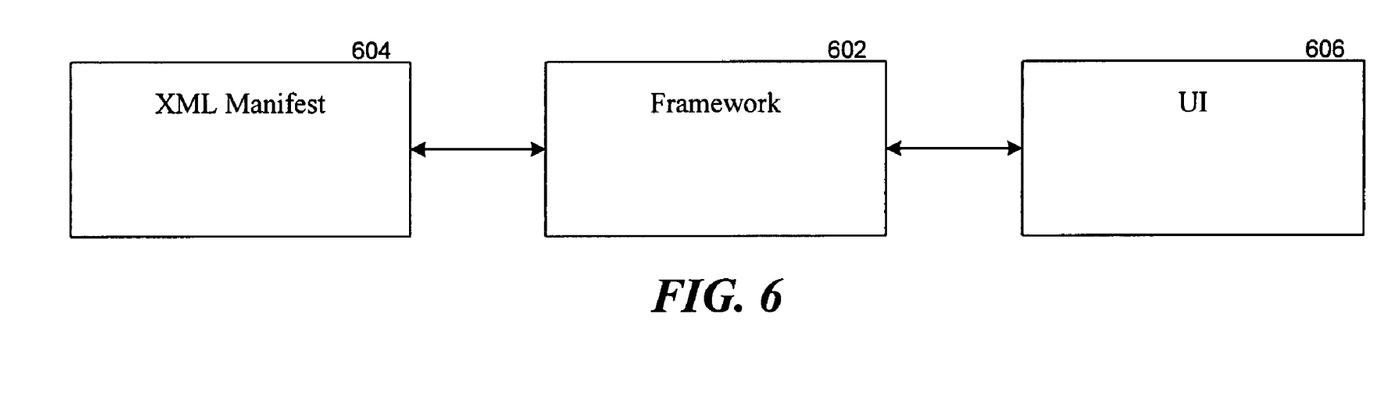
FIG. 6 is a high-level block diagram showing an environment in which the framework for extensible platform independent UI construction from data may operate.

FIG. 6 is a high-level block diagram showing an environment in which the framework for extensible platform independent UI construction from data may operate. As depicted, the environment comprises framework 602, XML manifest 604, and UI 606. In general terms, the framework decouples the entities, such as deployment/management entities that are displayed in the UI from the UI elements. In operation, the framework reads the XML manifest at runtime and generates the UI based on the contents of the XML manifest. The XML manifest contains declarative expressions that define what and how the framework is to display and render the UI elements for each entity. The framework also processes a user's actions in the displayed UI according to the XML manifest. In this manner, the framework makes possible the creation, modification or removal of UI elements, for example, after a product is released, by simply publishing a modified XML manifest or manifests. This greatly reduces the cost incurred by a product team performing between-release changes, and creates an opportunity for other developers, such as 3$^{rd}$ parties to create value-added extensions, such as plug-ins.

Figure 7:
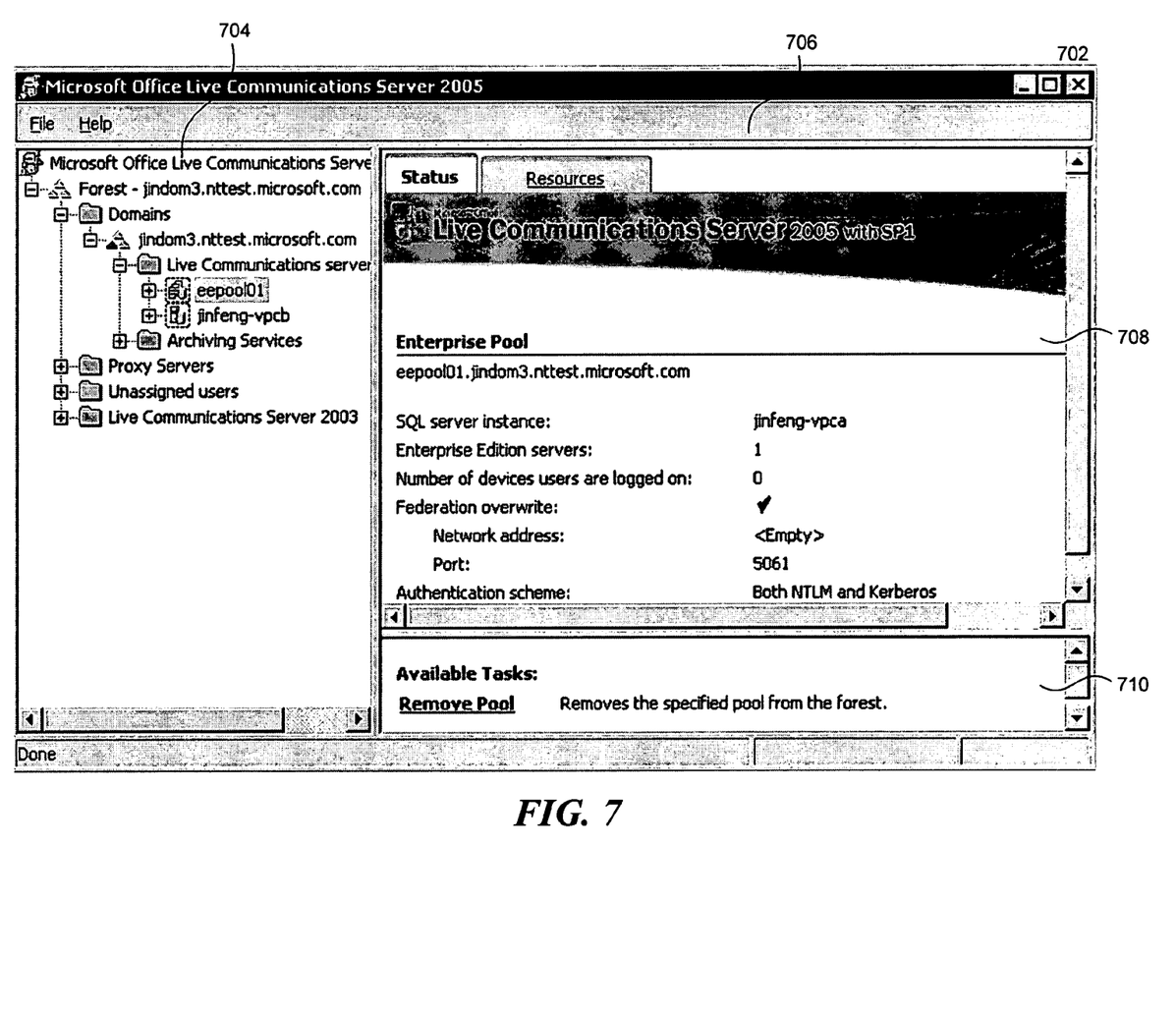
FIG. 7 illustrates an example UI produced by the framework.

In some embodiments, the framework provides a graphical UI that comprises a plurality of sections. FIG. 7 illustrates an example UI produced by the framework. As depicted, UI 702 comprises a scope pane 704 and a result pane 706, which comprises a tab frame 708 and a task frame 710. By way of example and as depicted in FIG. 7, the scope pane may contain deployment/management entities, such as "Forest," and within the "Forest" entities such as "Domains," "Proxy Servers," "Unassigned users," etc. The result pane may contain UI elements or sets of UI elements associated with a particular entity selected in the scope pane. In the depicted example, the result pane contains two sets of UI elements, "Status" and "Resources," which are each depicted as tabs and associated with the currently selected entity "eepool01" in the scope pane. Moreover, the tab frame is depicted as containing the contents of the UI element "Status" since the "Status" tab is currently selected in the result pane.

In some embodiments, a user, such as a developer, assigns a unique identifier, such as a Globally Unique Identifier (GUID), to each entity based on the entity type. Examples of entity types are items from the scope pane, such as forest, domain, pool, server, user, etc. In the XML manifest, the developer provides a 1 to N (where N>=1) mapping between a particular type of entity and all its possible sets of UI elements. In this manner, the developer achieves the association between the entities contained in the scope pane and their UI elements contained in the result pane.

Figure 8:
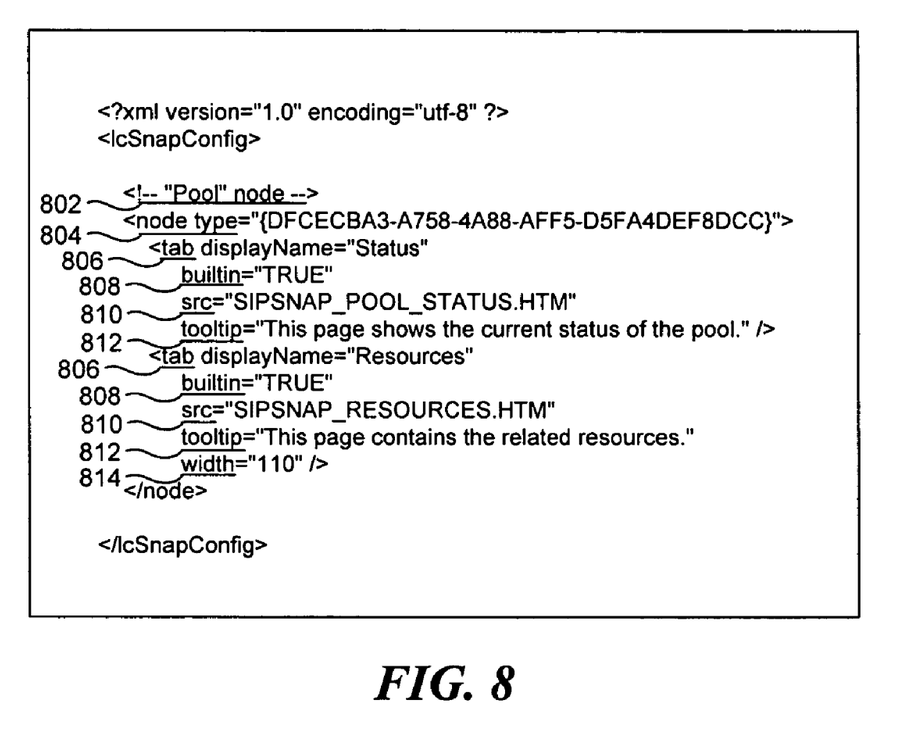
FIG. 8 illustrates a simplified XML manifest that describes the associations between the entity "Pool" and its sets of UI elements depicted in FIG. 7.

FIG. 8 illustrates a simplified XML manifest that describes the associations between the entity "Pool" and its sets of UI elements depicted in FIG. 7. Entry 802 specifies the name of an entity that is contained in the scope pane, for example, "Pool." Tag 804 is a "node type" tag and contains the unique identifier assigned to the node type, for example, "{DFCECBA3-A758-4A88-AFF5-D5FA4DEF8DCC}."
Tag 806 is a "tab" tag and contains the name of a UI element that is associated with the identified entity node, and which is to be rendered as a "tab" in the tab frame of the result pane. Attribute 808 is a Boolean attribute that indicates whether or not the contents that are to be displayed in the tab frame in association with the particular tag are internally known to the framework. Attribute 810 is a string attribute that identifies the location of the contents that are to be displayed in the tab frame in association with the particular tag. For example, if attribute 808 is set to "TRUE," then attribute 810 contains a URL that contains the page to be rendered, and the framework reads this URL as a html page from, for example, a resource file. Otherwise, if attribute 808 is set to "FALSE," then attribute 810 contains a URL of the page to be rendered by the framework in the tab frame. Attribute 812 is a string attribute that contains content to be displayed, for example, in a help window. Attribute 814, if present, specifies the width of the tab. As depicted in FIG. 8, the first tab associated with the "Pool" node is a "Status" tab, and the contents to be displayed in the tab frame are contained in the HTML page "SIPSNAP_POOL_STATUS.HTM." The second tab associated with the "Pool" node is a "Resources" tab, and the contents to be displayed in the tab frame are contained in the DHTML page "SIPSNAP_RESOURCES.HTM."

In some embodiments, to render the contents in the result pane in response to the "Pool" node being selected in the scope pane, the framework determines its node type "{DFCECBA3-A758-4A88-AFF5-D5FA4DEF8DCC}."
The framework then searches the XML manifest to match the node type. Upon finding a match in the XML manifest, the framework parses and validates the tab information in the matched node section, and creates the specified tabs in the result pane. The framework then loads a corresponding tab DHTML, for example, the DHTML of the first specified tab, which contains a set of logically related UI elements into the tab frame. In some embodiments, the framework performs the tab initialization and un-initialization, tab management, such as switching, rendering, event handling, etc., and communication between the tabs in the result pane and the entity node in the scope pane.

Figure 9:
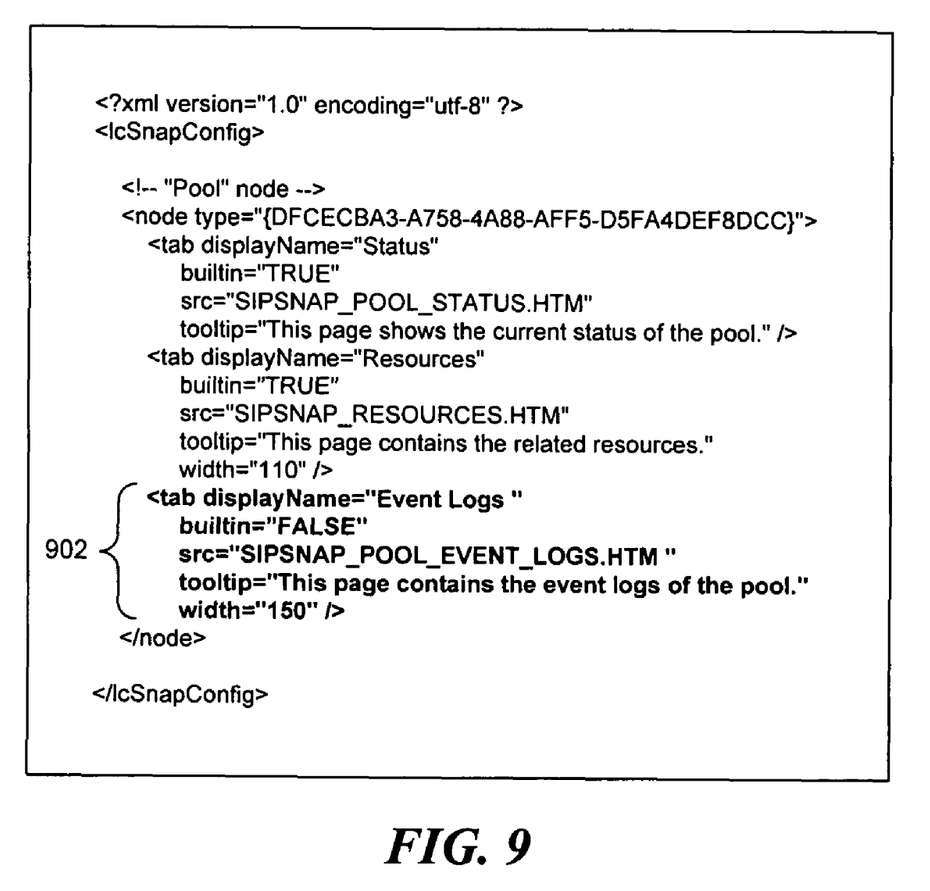
FIG. 9 illustrates a modified XML manifest that includes a new tab associated with the entity "Pool."

FIG. 9 illustrates a modified XML manifest that includes a new tab associated with the entity "Pool." In particular, the modified XML manifest is a modification of the XML manifest illustrated in FIG. 8 to add a new tab "Event Logs" for the entity "Pool." For example, subsequent to product release of application software, the developer may find a need or desire to add a new tab, for example, "Event Log," for the entity "Pool." To add the new "Event Log" tab, the developer identifies the new tab in the existing XML manifest for the entity "Pool." As depicted in FIG. 9, the developer identifies the newly added "Event Log" tab in section 902, and creates a new SIPSNAP_POOL_EVENT_LOGS.HTM file, which contains the set of UI elements. The developer can then publish these two text files—i.e., the modified XML manifest and the new SIPSNAP_POOL_EVENT_LOGS.HTM file. Customers can then download these two files and apply the addition while the software is running. In a similar manner, $3^{rd}$ party developers can also extend the tabs for an existing entity in the software.

In some embodiments, the framework provides an asynchronous contextual communication channel between the tabs in the result pane and the entities in the scope pane, for example, for gathering data from the entities in the scope pane (e.g., in case of a pool, the gathered data relevant to the pool may include backend name, pool name, etc.). The contextual communication channel enables the tabs in the result pane to display UI elements in the context of the selected entity node in the scope pane. Using the contextual communication channel, the "Status" tab for the "Pool" node in the scope pane can display "Pool" related properties and settings in the result pane, while the "Status" tab for a "Server" node in the scope pane can display "Server" related properties and settings in the result pane.

In some embodiments, the contextual communication channel is XML based and content-agnostic. Each individual tab in the result pane can request context XML from the entity node in the scope pane via the communication channel. For example, the "Status" tab in the result pane can request context information from its "Pool" node in the scope pane. In response, the "Pool" node can send to the "Status" tab the requested context in XML form.

Figure 10:
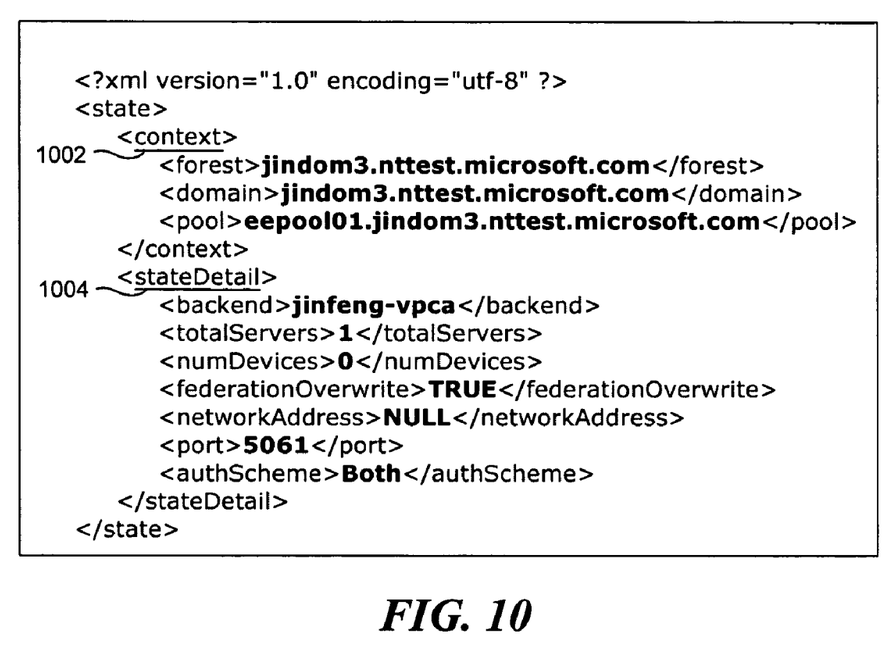
FIG. 10 illustrates an example context XML sent from the "Pool" node to the "Status" tab.

FIG. 10 illustrates an example context XML sent from the "Pool" node to the "Status" tab. As depicted, a "<context>" node 1002 provides context information to the tab. From the contents of the "<context>" section, the tab is able to determine the entity it is communicating with—i.e., the entity it is associated with—and other information the entity possesses. For example, the context may contain the information necessary to identify the entity that this tab is acting upon. As depicted in FIG. 10, the context identifies the pool name (since the entity is a pool), the domain name that contains this pool, and the forest name that contains this domain. A "<stateDetails>" node 1004 contains the state of the entity. As depicted, the stateDetails contains the attributes or properties of the pool that the user has clicked in the scope pane. For example, the backend of this pool, total number of servers in this pool, total number of users logged on to this pool, etc. In some embodiments, the format of the "<context>" section may be fixed. This allows $3^{rd}$ parties—e.g., developers who did not create the software—to develop plug-in tabs that can retrieve information using the contextual communication channel and perform tasks based on the context information contained in the "<context>" node.

One skilled in the art will appreciate that the framework can support web-based applications. For web-based applications, the construct would be similar to that described above in that the web UI can comprise a scope pane and a result pane. The scope pane tree view control can be constructed and rendered on the server side, and the composition of result pane can be rendered on the client side using the contents of the XML manifest. One difference is that a click event on a tab, rather than possibly resulting in a page loading locally as described above, triggers, for example, a HTTP-POST with tab information back to the server, and the server retrieves the new page and pushes the new page down to the client. One skilled in the art will also appreciate that the asynchronous communication channel also differs in operation in that, instead of communicating to the scope pane, for example, on the local process as described above, the asynchronous communication channel issues an HTTP-POST to the server, and subsequently triggers a refresh of the result pane.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable storage medium containing computer-executable instructions implementing a framework for declarative expression of data processing, the framework comprising:
   an interface that is accessible by an application to access data from multiple data stores that store data in different formats;
   a metadata-driven infrastructure comprising
      declarative representations of metadata for the data supported by the framework, the declarative representations of metadata specifying classes of data with properties, class validation rules and property validation rules, and a mapping of classes to data stores; and
      a data store adapter for each of the multiple data stores that provides access to data of the data store by performing conversions between data of a class mapped to the data store and data of the data store; and
   a framework engine being operable to process a call from the application via the interface to access data of the multiple data stores based on the classes specified in the declarative representations by utilizing the metadata-driven infrastructure to validate data of a class and data of the properties of the class based on the declarative representation of metadata specifying class validation rules and property validation rules, to identify using the mapping a data store adapter for accessing data of the class, and to invoke the identified data store adapter to access data of the class as represented by the call from the application
   wherein the validation rules are stored in a declarative manner and the validation process is decoupled from the application.

2. The computer-readable storage medium of claim 1, wherein the declarative representations of metadata is in a markup language.

3. The computer-readable storage medium of claim 2, wherein the markup language is XML.

4. The computer-readable Storage medium of claim 1, wherein the declarative representations of metadata represent the data using a set of data types.

5. The computer-readable storage medium of claim 1, wherein the declarative representations of metadata allow for declaratively specifying a custom validation routine.

6. The computer-readable storage medium of claim 1, wherein the declarative representations of metadata allow for declaratively specifying data store specific information.

7. A computer-implemented method performed by a computer programmed to process a call from an application program to access data from multiple data stores storing data in different formats, the method comprising:
proviging declarative representations of metadata for supported classes of data, the representations of metadata declared separate from logic of the application program, the declarative representation specifying properties of the classes of data and specifying class validation rules and property validation rules;
providing a mapping of the supported classes of data to data stores that store data corresponding to the properties of the classes, the mapping provided separate from the application logic, the mapping identifying for each supported class of data a data store that contains the class of data;
providing a data store adapter for each of the multiple data stores that provides access to data of the data store by performing conversions between data of a class mapped to the data store and data of the data store; and
processing by a framework engine a call by the application program to access a supported class of data by utilizing the declarative representations of metadata:
to validate class and properties based on the declarative representation of metadata specifying class validation rules and property validation rules;
to identify, using the mapping of supported classes of data to the data stores, a data store adapter for accessing data of the class; and
to invoke the identified data store adapter to access data of the class as represented by the call from the application program.

8. The method of claim 7, wherein the declarative representations of metadata is in XML.

9. The method of claim 7, wherein the declarative representations of metadata represent the supported classes of data using a set of data types.

10. The method of claim 7, wherein the declarative representations of metadata include at least one declarative expression containing data store specific information.

11. The method of claim 10, wherein the data store specific information comprises information specifying how the class of data is stored in its mapped data store.

12. A computer-readable storage medium whose contents of computer-executable instructions cause a computer to provide access to supported classes of data, the data being provided by multiple data stores storing data in different formats, by performing a method comprising:
providing declarative representations of metadata for supported classes of data, the representations of metadata declared separate from application program logic, the declarative representation specifying properties of the classes and validation rules for the classes and properties;
providing a mapping of the supported classes of data to data stores;
providing a data store adapter for each of the multiple data stores that provides access to data of the data store by performing conversions between data of classes mapped to the data store and data of the data store;
receiving at a framework engine a call from an application to access a particular class of data; and
processing by the framework engine the call to access a particular class of data by:
determining from the declarative representations of metadata any validation to perform on the particular class of data;
if the declarative representation of metadata indicates that a validation is to be performed on the particular class of data, performing the validation on the particular class of data;
determining from the mapping of the supported classes of data to data stores a data store containing the particular class of data; and
invoking the data store adapter for the determined data store to access the particular class of data contained in the data store specified by the mapping of the supported classes of data to data stores and to perform conversions between data of the class and data of the data store.

13. The computer-readable storage medium of claim 12, wherein the call to access a particular class of data is a call to read the particular class of data.

14. The computer-readable storage medium of claim 12, wherein the call to access a particular class of data is a call to write the particular class of data.

* * * * *

UNITED STATES PATENT AND TRADEMARK OFFICE
CERTIFICATE OF CORRECTION

PATENT NO. : 7,739,691 B2
APPLICATION NO. : 11/118155
DATED : June 15, 2010
INVENTOR(S) : Ferhan Elvanoglu et al.

It is certified that error appears in the above-identified patent and that said Letters Patent is hereby corrected as shown below:

In column 13, line 1, in Claim 4, delete "Storage" and insert -- storage --, therefor.

Signed and Sealed this
Tenth Day of May, 2011

David J. Kappos
*Director of the United States Patent and Trademark Office*